United States Patent
Lin

(10) Patent No.: US 9,504,352 B2
(45) Date of Patent: Nov. 29, 2016

(54) BARBECUE GRILL

(71) Applicant: Hung Mei Lien, Taipei (TW)

(72) Inventor: Chih-Jen Lin, Shenzhen (CN)

(73) Assignee: Hung Mei Lien, Taipei (TW)

( * ) Notice: Subject to any disclaimer, the term of this patent is extended or adjusted under 35 U.S.C. 154(b) by 126 days.

(21) Appl. No.: 14/252,490

(22) Filed: Apr. 14, 2014

(65) Prior Publication Data

US 2015/0238048 A1   Aug. 27, 2015

(30) Foreign Application Priority Data

Feb. 26, 2014   (CN) .................... 2014 2 0084715 U

(51) Int. Cl.
*A47J 37/06* (2006.01)
*A47J 37/07* (2006.01)

(52) U.S. Cl.
CPC ......... *A47J 37/0682* (2013.01); *A47J 37/0713* (2013.01); *A47J 37/0786* (2013.01)

(58) Field of Classification Search
CPC ............. A47J 37/0682; A47J 37/0713; A47J 37/0786
USPC ................. 99/339, 340, 400, 445, 446, 482; 126/25 R, 36, 38, 41 R
See application file for complete search history.

(56) References Cited

U.S. PATENT DOCUMENTS

| | | | | |
|---|---|---|---|---|
| 5,318,322 A * | 6/1994 | Home | ................. | A47J 37/0713 126/9 R |
| 5,553,601 A * | 9/1996 | Parker | ................. | A47J 37/0763 126/38 |
| 6,125,838 A * | 10/2000 | Hedgpeth | ........... | A47J 37/0713 126/305 |
| 2004/0025862 A1 * | 2/2004 | Lor | ..................... | A47J 37/0786 126/41 R |
| 2004/0112361 A1 * | 6/2004 | Zelek | .................. | A47J 37/0704 126/25 R |
| 2004/0112365 A1 * | 6/2004 | Johnson | ............. | A47J 37/0713 126/41 R |
| 2005/0121020 A1 * | 6/2005 | McLemore | ......... | A47J 37/0704 126/25 R |
| 2005/0284461 A1 * | 12/2005 | Hsu | ..................... | A47J 37/0713 126/41 R |
| 2007/0221202 A1 * | 9/2007 | Bruno | ................. | A47J 37/0713 126/41 R |
| 2012/0266760 A1 * | 10/2012 | Bryce | .................... | A47J 33/00 99/448 |

* cited by examiner

*Primary Examiner* — Thien S Tran
(74) *Attorney, Agent, or Firm* — Hamre, Schumann, Mueller & Larson, P.C.

(57) ABSTRACT

The present invention relates to the technical field of a barbecue utensil and discloses a barbecue grill including a barbecue grill body having a cavity with an opening in an upper end, a heating furnace head and a hot plate are disposed in the cavity, and a barbecue wire mesh is disposed on the opening of the cavity, the hot plate covers the whole top of the heating furnace head and is provided with a plurality of ventilation holes, and an upper surface of the hot plate is inclined and is provided with a plurality of covering plates on the positions corresponding to the ventilation holes, each covering plate covers the whole top of the ventilation hole, one end of the covering plate is connected to an upper surface of the hot plate and the other end extends slantwise downwards and a gap is disposed between the upper surface of the hot plate and the other end of the covering plate.

12 Claims, 6 Drawing Sheets

BARBECUE GRILL

TECHNICAL FIELD

The present invention relates to the technical field of a barbecue utensil, and more particularly, to a barbecue grill.

BACKGROUND

The barbecue grill is a device that cooks food by the hot air, is generally with a closed or semi-closed structure, and can also refer to a device that implements a high temperature treatment by the hot air.

In the prior art, the barbecue grill includes a barbecue grill body, the barbecue grill body has a cavity with an opening in an upper end, a heating furnace head is disposed in the cavity, and a barbecue wire mesh is disposed on the opening of the cavity, such that during baking or barbecue, the food to be barbecued is put onto the barbecue wire mesh, the heating furnace head is in a heated state, the heat make the air become hot to heat the food on the barbecue wire mesh.

When some meat food is barbecued, the oil of the meat food drops along the barbecue wire mesh and then on the heating furnace head, therefore a fire is caused, which not only affects the barbecue quality but also leads to dangerous accidents, in addition, an oil stain will be formed on the heating furnace head after a long time, which will reduce the heating efficiency of the heating furnace head.

For the above mentioned problem, a baffle is disposed on a part of the barbecue wire mesh corresponding to the heating furnace head to avoid the oil generated by the meat food dropping on the heating furnace head. However, the baffle is directly disposed on the barbecue wire mesh, such that the meat food is put directly onto the baffle and the baffle separates the meat food, that will reduce the heating efficiency of the heating furnace head to the food, that is, the food to be barbecued needs a longer barbecue time, greater energy consumption, and barbecue effect is poor.

SUMMARY

The purpose of the present invention is to provide an barbecue grill, aims at solving the problem that the barbecue grill in the prior art is provided with a baffle directly onto the barbecue wire mesh to block the oil thereby leading to a low heating efficiency of the heating furnace head, large energy consumption and poor barbecue effect.

The present invention is implemented by a barbecue grill which includes a barbecue grill body having a cavity with an opening in an upper end, a heating furnace head is disposed in the cavity, and a barbecue wire mesh is disposed on the opening of the cavity, a hot plate is disposed in the cavity, the hot plate covers the whole top of the heating furnace head and is provided with a plurality of ventilation holes, and an upper surface of the hot plate is inclined and is provided with a plurality of covering plates on the positions corresponding to the ventilation holes, each covering plate covers the whole top of the ventilation hole, one end of the covering plate is connected to the upper surface of the hot plate and the other end extends slantwise downwards and a gap is disposed between the upper surface of the hot plate and the other end of the covering plate.

Furthermore, a middle portion of the hot plate is upheaval shaped, two sides of the hot plate is inclined downward to form an inclined plate respectively, and the inclined-portions are provided with the ventilation hole respectively.

Furthermore, the ventilation holes are strip-shaped and are disposed along a direction parallel to the side of the inclined plate.

Furthermore, an inner side wall of the cavity is provided with two bosses being oppositely arranged, the boss is disposed on an outer side of the heating furnace head, and the two sides of the hot plate are respectively connected to the bosses.

Furthermore, the boss is provided with a connecting strip which is provided with an elastic strip extending upward, and the hot plate is provided with an installing hole to be inserted by the elastic strip.

Furthermore, a bottom of the cavity is provided with an oil falling hole, a lower end of the barbecue grill body is connected to an oil groove of which a recess is provided for aligning with the oil falling hole.

Furthermore, the heating furnace head is a heating tube, the heating tube is bent in the cavity and extends beyond the cavity to form a connecting tube head for connecting with a gas tank, and the connecting tube head is connected to an igniter.

Furthermore, the two ends of the barbecue grill body are respectively connected to a supporting frame, the supporting frame includes two supporting arms connected to the two sides of the two ends of the barbecue grill body respectively, an upper end of the supporting arm is connected to an outer side wall and a lower end of the supporting arm extends downward and is disposed away from the barbecue grill body.

Furthermore, the upper end of the supporting arm extends away from the barbecue grill body and forms an extending strip, a placing plate is disposed between and connected with two extending strips of the supporting arms on the end of the barbecue grill body, the placing plate is horizontal.

Furthermore, the barbecue grill includes a moving frame, an upper end of the moving frame is connected to the supporting frame and a lower end of the moving frame is provided with a scrolling wheel.

Furthermore, the moving frame includes two parallel cross brackets spaced and an installing frame connected to the supporting frame, each cross bracket includes two bracket arms, and middle portions of the two bracket arms are hinged with each other, the installing frame is respectively connected to an upper end of the respective bracket arm, the scrolling wheel is disposed on a lower end of the bracket arm on one side of the two cross brackets, and a fixing rod is connected to the lower ends of the bracket arm on the other side of the two cross brackets.

Compared with the prior art, the barbecue grill of the present invention is with the hot plate disposed in the cavity and covering the whole top of the heating furnace head, which may avoid the oil generated by the meat food dropping on the heating furnace head, such that the heating furnace head doesn't generate a fire, therefore the barbecue quality may be ensured and dangerous accidents may be avoided, furthermore, the oil stain won't be formed on the heating furnace head, and even after long-term use, the barbecue grill can still ensure the heating efficiency of the heating furnace head and the energy consumption may be reduced. The hot plate is provided with ventilation hole for allowing the hot to pass through, the upper surface of the hot plate is inclined surface shaped and is provided with a plurality of covering plates on the positions corresponding to the ventilation holes, each covering plate covers the whole top of the ventilation hole, and a gap is disposed between the upper surface of the hot plate and the covering plate, such that the hot air won't be blocked. The hot plate is far away from the barbecue wire mesh, such that when the food is put onto the barbecue wire mesh, the hot plate doesn't block out the food and affect the heating for the food on the barbecue wire mesh, therefore the heating efficiency is high and the barbecue efficiency is good.

DETAILED DESCRIPTION

To make the objectives, technical solutions and advantages of the present invention clearer, the present invention will be further described hereafter with reference to the accompany drawings and embodiments. It shall be understood that, the embodiments described herein are only intended to illustrate but not to limit the present invention.

The implement of the present invention will be described in detail with reference to the embodiments.

Figure 1:
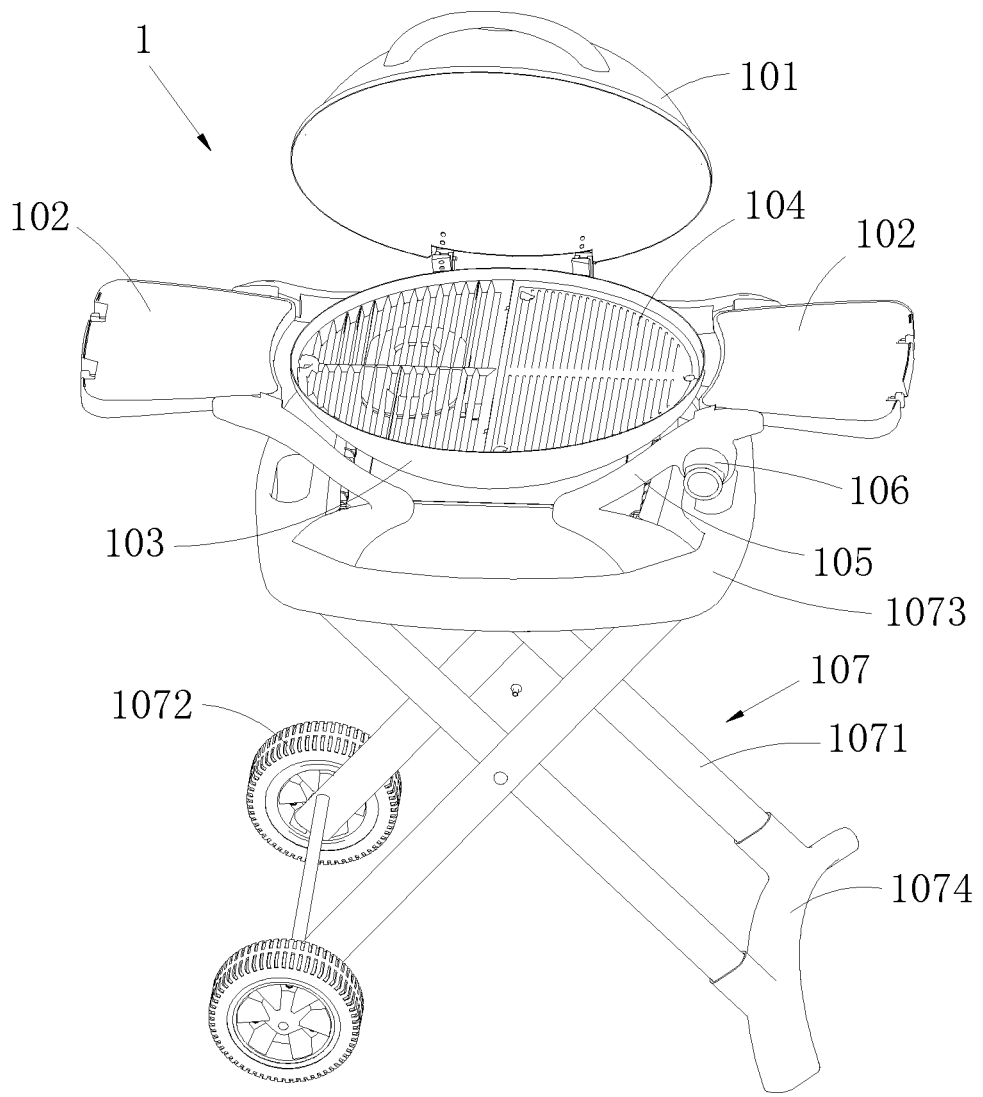
FIG. 1 is a schematic perspective view of a barbecue grill of an embodiment of the present invention.
Figure 2:
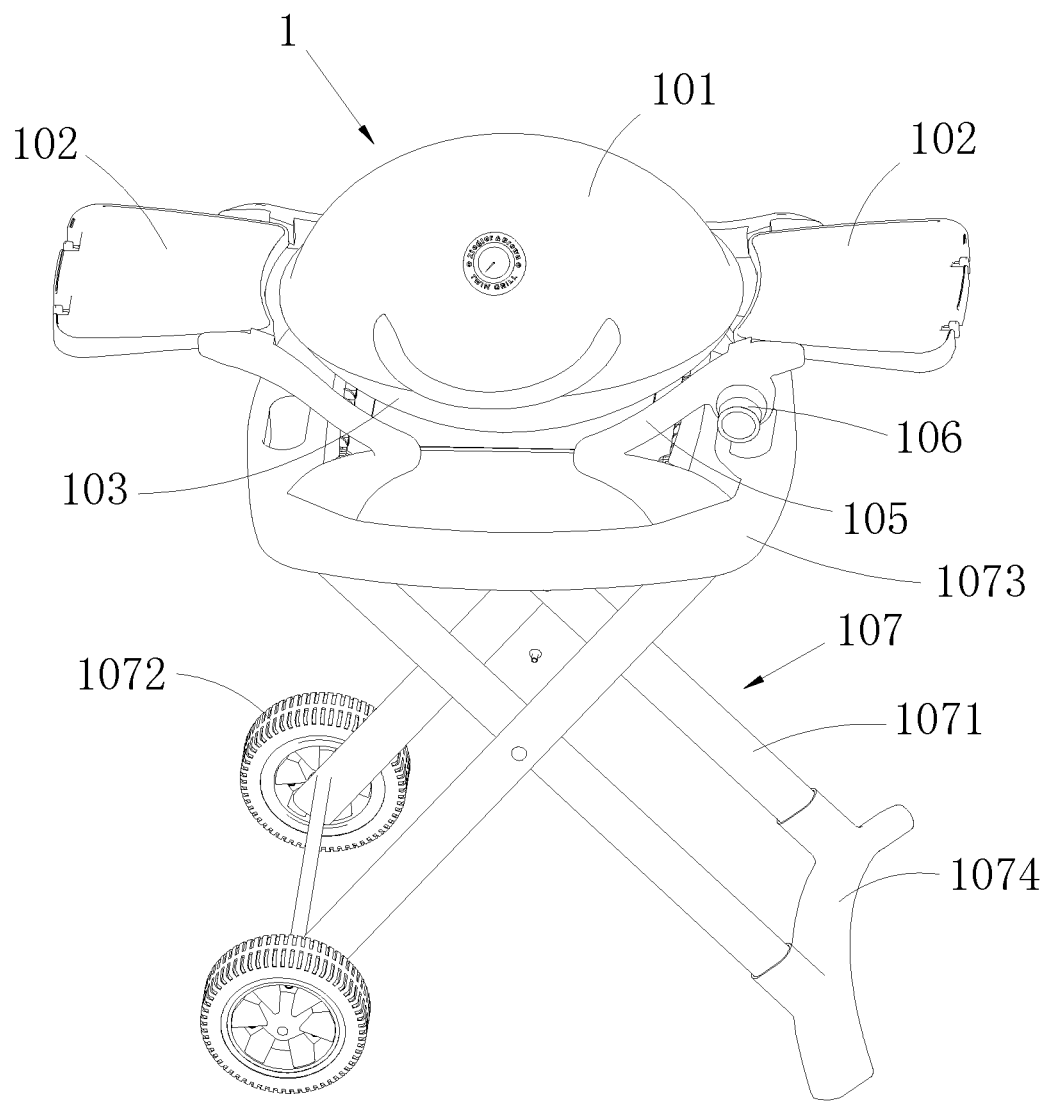
FIG. 2 is a schematic perspective view of the barbecue grill of the embodiment of the present invention.
Figure 3:
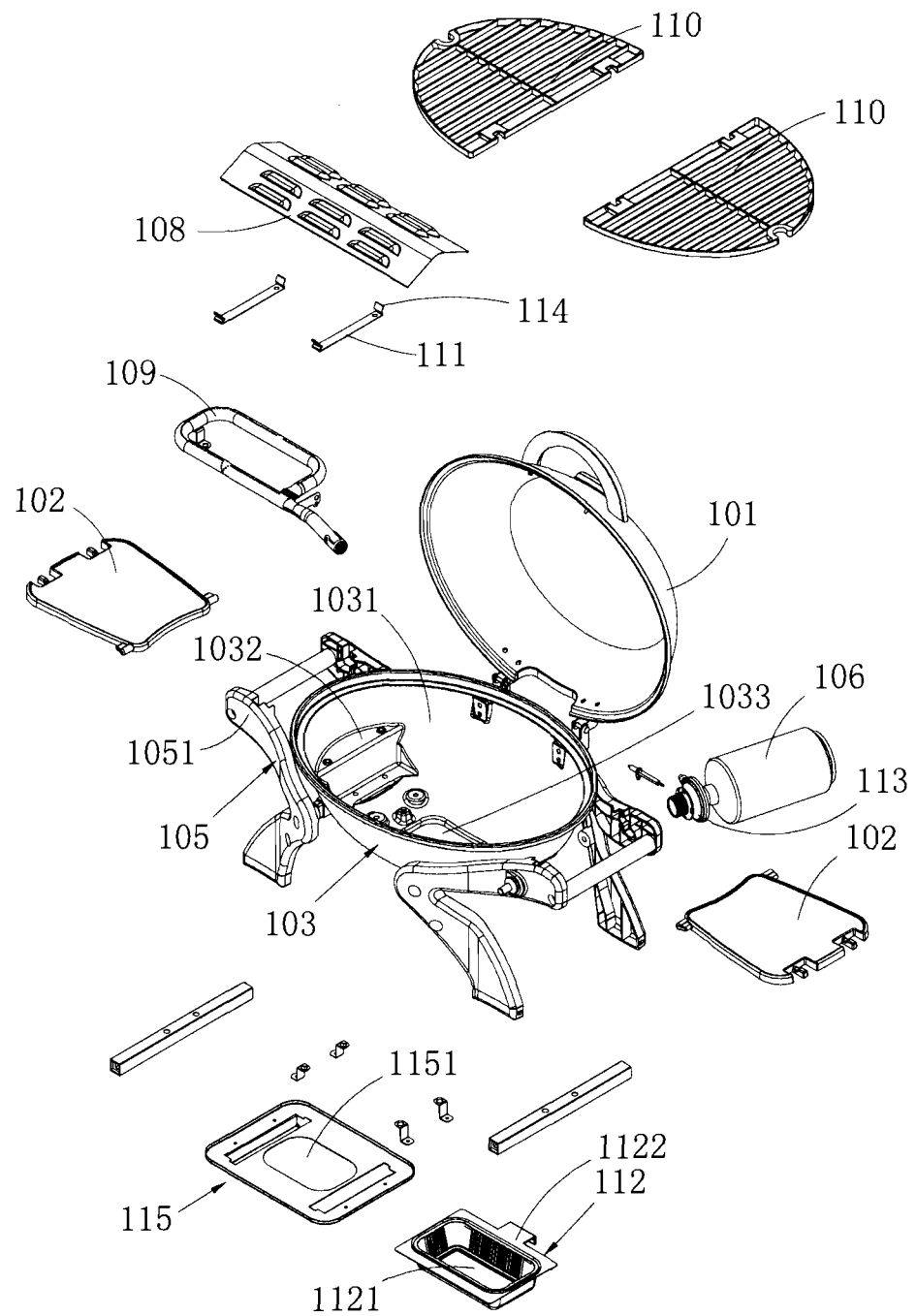
FIG. 3 is a schematic explosive view of the barbecue grill of the embodiment of the present invention.
Figure 4:
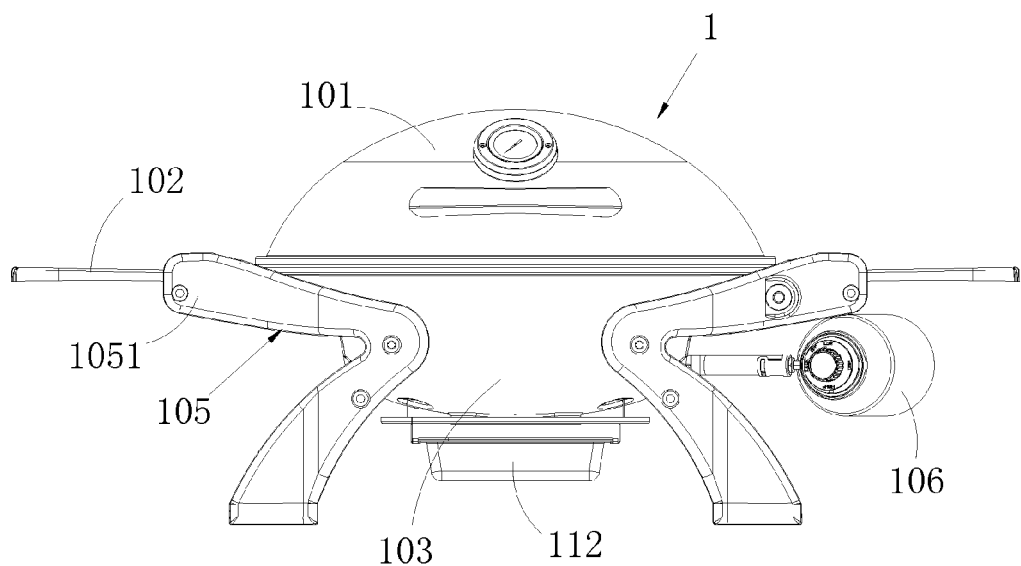
FIG. 4 is a schematic front view of the barbecue grill of the embodiment of the present invention.
Figure 5:
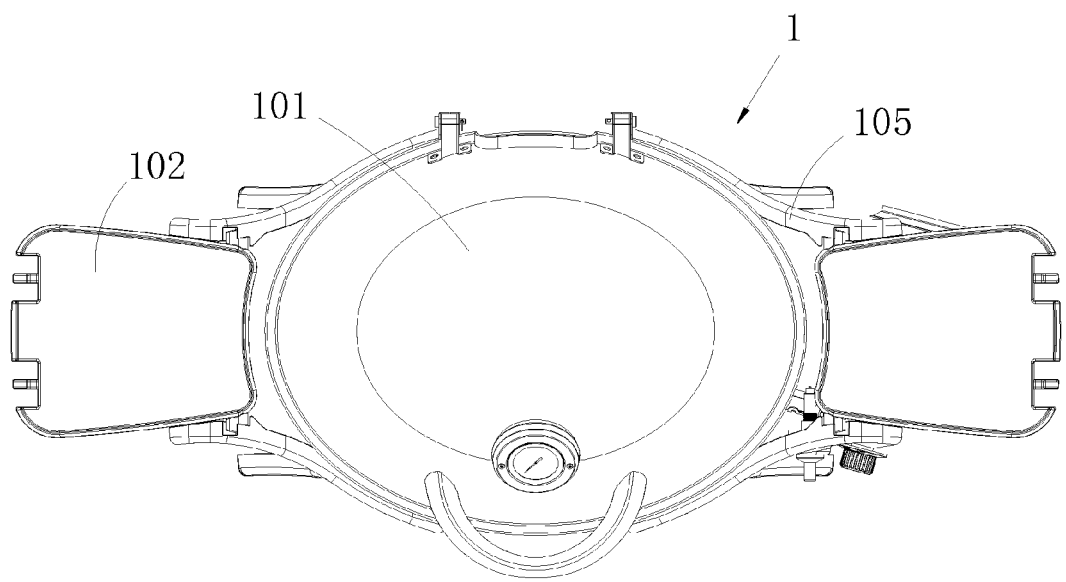
FIG. 5 is a schematic top view of the barbecue grill of the embodiment of the present invention.
Figure 6:
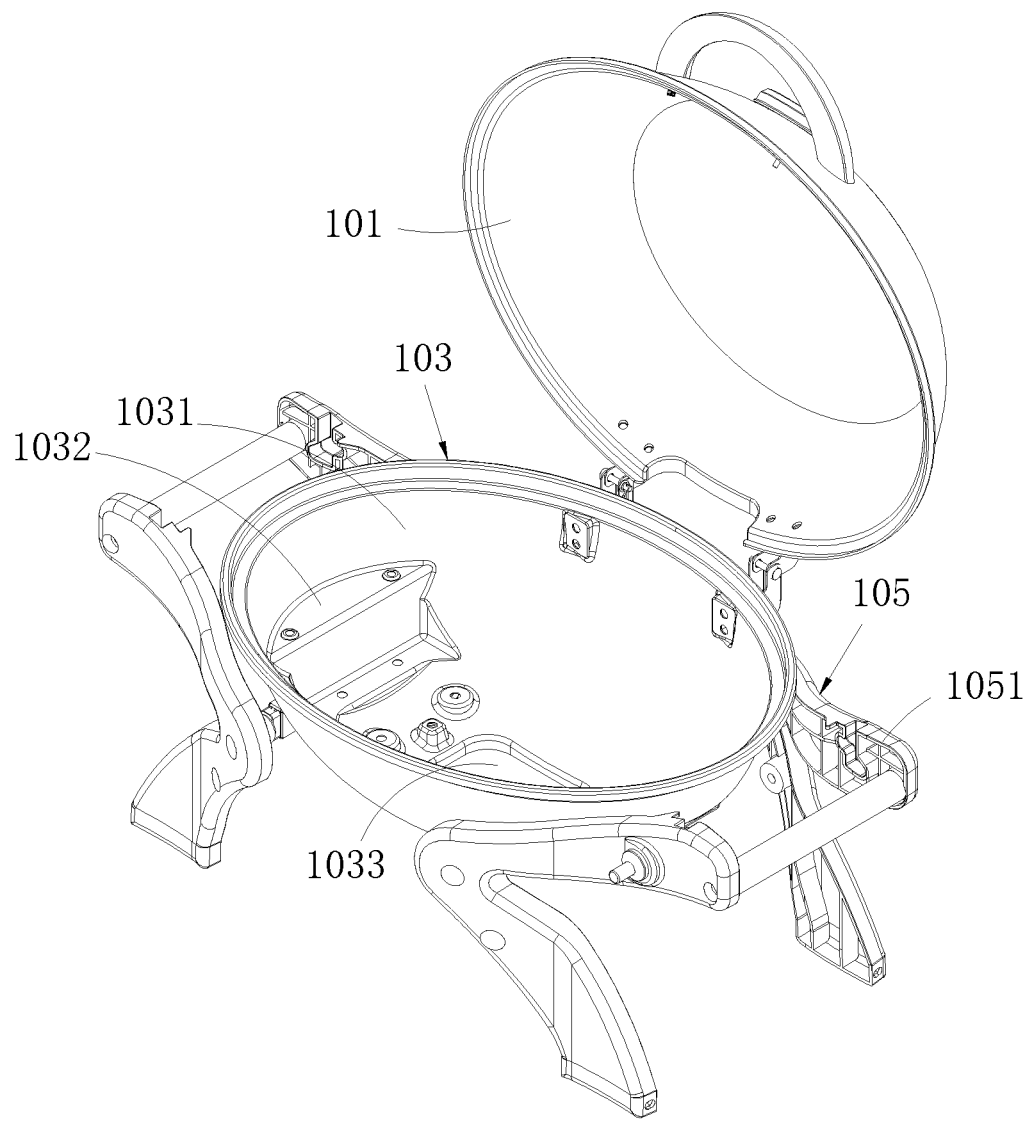
FIG. 6 is a schematic perspective view of a part of the barbecue grill of the embodiment of the present invention.
Figure 7:
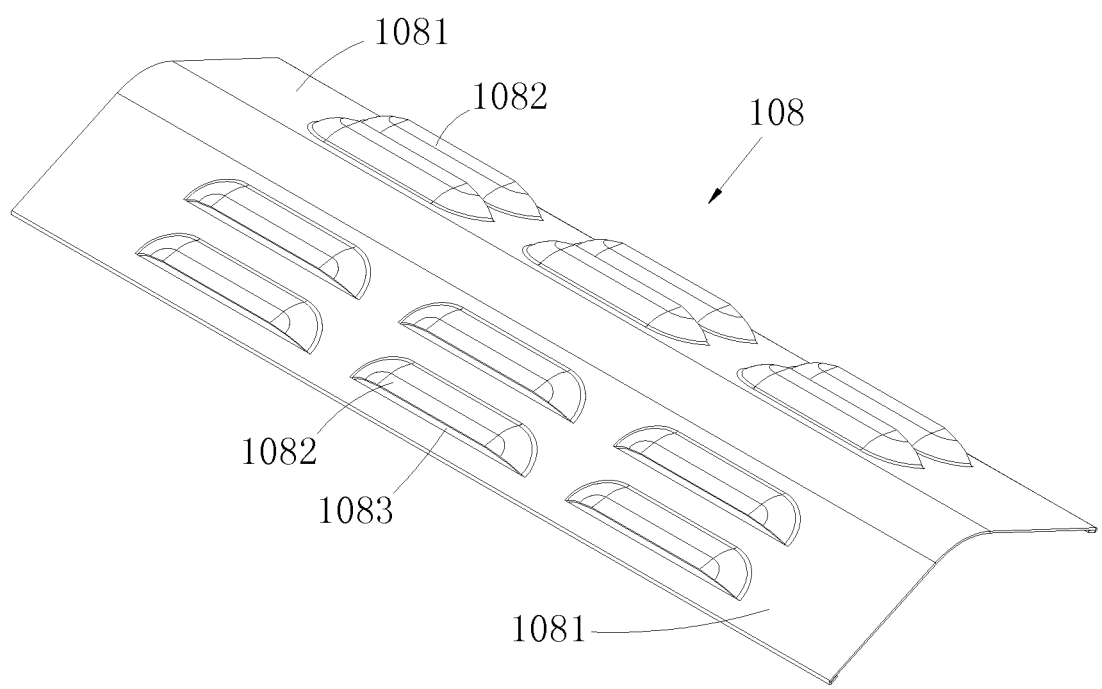
FIG. 7 is a schematic perspective view of a hot plate of the embodiment of the present invention.

Referring to FIGS. 1 to 7, an embodiment of the present invention is provided.

The barbecue grill 1 in the embodiment is used to bake or barbecue food, the barbecue grill includes a barbecue grill body 103, the barbecue grill body 103 is semiellipsoid shape and has a semiellipsoid shaped cavity 1031 with an opening in an upper end, a heating furnace head 109 for generating heat is disposed in the cavity 1031. When the heating furnace head 109 works, the air in the cavity 1031 is heated and becomes hot air, and the hot air spreads from the opening of the cavity 1031. A barbecue wire mesh 110 is disposed on the opening of the cavity 1031, when there is a need of barbecuing food, the food is put on the barbecue wire mesh 110 and the food on the barbecue wire mesh 110 is heated by using the hot air spreading from the opening of the cavity 1031 to barbecue or bake the food.

A hot plate 108 is also disposed in the cavity 1031, the hot plate 108 is disposed above the heating furnace head 109, connected to a side wall of the cavity 1031, and covers a whole top of the heating furnace head 109. The hot plate is V-shaped and disposed in the semiellipsoid shaped cavity upside down and is provided with a plurality of ventilation holes (not shown), the plurality of ventilation holes pass through an upper end and a lower end of the hot plate 108 respectively, through the ventilation hole, the hot air heated by the heating furnace head 109 may pass through the hot plate 108. Of course, the hot air also passes through the gap 1083 between the hot plate 108 and the side wall to heat the food on the barbecue wire mesh 110.

When the oil generated by the food on the barbecue wire mesh 110 drops, the oil falls onto the hot plate 108. To avoid the oil passing through the hot plate 108 directly and falling onto the heating furnace head 109, a plurality of covering plates 1082 is disposed on the positions corresponding to the ventilation holes. One end of the covering plate 1082 is connected to the upper surface of the hot plate 108, and the covering plates 1082 extend slantwise downwards and cover the respective ventilation holes, a gap 1083 is disposed between the upper surface of the hot plate 108 and the other end of the covering plate.

Such when the oil falls onto the upper surface of the hot plate 108, the oil flows downward along the upper surface of the hot plate 108. Because one end of the covering plate 1082 is connected to an upper end of the ventilation hole, the oil won't drop into the ventilation hole. And the covering plate 1082 covers the whole ventilation hole, which avoids the oil dropping into the ventilation hole. In addition, the gap 1083 is disposed between the upper surface of the hot plate 108 and the other end of the covering plate 1082, the hot air won't be prevented from passing through ventilation hole of the hot plate 108.

The barbecue grill 1 of the embodiment is with the hot plate 108 disposed in the cavity and above the heating furnace head 109, which may avoid the oil generated by the food dropping on the heating furnace head 109, and avoid the heating furnace head 109 generating fire, therefore the barbecue quality may be ensured and dangerous accidents may be avoided, furthermore, the oil stain won't be formed on the heating furnace head 109, and even after long-term use, the barbecue grill can still ensure the heating efficiency of the heating furnace head 109 and the energy consumption may be reduced. In addition, The hot plate 108 is far away from the barbecue wire mesh 110, such that when the food is put onto the barbecue wire mesh 110, the hot plate 108 doesn't block out the food, and the hot air heated by the heating furnace head 109 may pass through the ventilation hole, the heat for the food on the barbecue wire mesh 110 won't be affected, therefore the heating efficiency is high and the barbecue efficiency is good.

In this embodiment, only one heating furnace head 109 is disposed in the cavity 1031, thus the volume of the barbecue grill 1 may be greatly reduced and the barbecue grill 1 is easy to be carried. Even for outdoor barbecue, the barbecue grill is easy to be carried. In other embodiment, two or more heating furnace head 109 is disposed in the cavity 1031, the number of the heating furnace head 109 is depending on the actual requirement.

The heating furnace head 109 is a heating tube, the heating tube is bent in the cavity 1031 and extends beyond the cavity 1031 to form a connecting tube head for connecting with a external gas tank 106, the gas enters the heating tube and is used for heating, such that the heating tube becomes hot and thus the air becomes hot.

In this embodiment, the barbecue grill 1 further includes a gas tank 106, the volume of the gas tank 106 may be small or large, and the volume of the gas tank may be depending on the environment and usage time. In addition, to facilitate ignition of the heating furnace head 109 of the barbecue grill 1, the connecting tube head of the heating tube is connected to an igniter 113. When the gas enters the heating tube, the igniter 113 is pressed or twisted to ignite the gas to implement heating.

Inclined portions 1081 of the V-shared hot plate are provided with the plurality of ventilation holes respectively. The inclined portions 1081 are provided with a plurality of covering plates 1082 respectively corresponding to each ventilation hole.

In this embodiment, the ventilation holes are strip-shaped and are disposed along the direction parallel to the side of the inclined portions 1081, each inclined portion may be provided with two rows of ventilation holes. The ventilation holes may be circular or with other shape, is not limited the shape in this embodiment.

In other embodiment, the hot plate 108 may be with other structure. In this embodiment, the hot plate 108 is formed by connecting two inclined portions 1081 together. The hot plate 108 also may be formed by one inclined plate 1081 and is inclined from one side to another side. Or the upper surface of the hot plate 108 may be conical, the middle portion of the hot plate is upheaval shaped and the periphery of the hot plate are inclined outward, the specific structure may be depended on the actual requirement.

To facilitate the assembly and disassembly of the hot plate 108, the inner side wall of the barbecue grill body 103 is provided with two flat bosses 1032 being symmetrically arranged, the two flat bosses 1032 are respectively disposed on an outer side of the heating furnace head 109 and are symmetrically arranged, such that the whole hot plate 108 may cover the top of the heating furnace head 109, the connection mode may be various, such as screw connection, snap-in connection and so on.

Specifically, the boss 1032 is provided with a connecting strip 111 which is provided with an elastic strip 114 extending upward. Accordingly, the hot plate 108 is provided with an installing hole. The hot plate 108 is steadily connected to the boss 1032 by inserting the elastic strip 114 into the installing hole. Because the elastic strip 114 has the effect of elastic deformation, it facilitates the assembly and disassembly of the hot plate 108.

Each connecting strip 111 is provided with two elastic strips 114. Accordingly, two inclined portions 1081 of the hot plate 108 are respectively provided with one installing hole, such that the hot plated fixed on the boss 1032 are more steady and balanceable.

The oil drops on the hot plate 108, and then falls into the bottom of the cavity. To avoid the oil accumulating in the bottom of the cavity 1031 and to facilitate the collection of the oil, in this embodiment, the bottom of the cavity 1031 is provided with an oil falling hole1033. The oil falling hole1033 communicates with the cavity 1031 and outside. The lower end of the barbecue grill body 103 is connected to an oil groove 112 which is provided with a recess 1121 for containing the oil. After the oil groove 112 is connected to the lower end of the barbecue grill body 103, the oil falling hole1033 is aligned with the recess 1121. The oil groove 112 is further provided with a handle 112 for being gripped by the user.

The area of the upper end of the recess 1121 should be larger than that of the oil falling hole 1033 to avoid the oil from the oil falling hole 1033 being out of the recess 1121.

The lower end of the barbecue grill body 103 is connected to an installing plate 115. The installing plate 115 is provided with a through hole 1151. After the installing plate 115 is connected to the lower end of the barbecue grill body 103, the through hole 1151 is aligned with the oil falling hole 1033. A lower end of the installing plate 115 is provided with two sliding grooves which are parallel and spaced. Accordingly, two sliding rails are disposed on the two sides of the oil groove 112 and are parallel and spaced. The sliding rail may be disposed in the sliding groove and slides in the sliding groove thereby facilitating the assembly and disassembly of the oil groove 112 and the installing plate 115, thus it is convenient for the user to clean oil stain in the recess 1121 of the oil groove 112.

The connection mode between the oil groove 112 and the installing plate 115 may be with other structure that enables the oil groove 112 to be connected to or disconnected to the installing plate 115, for example, the sliding groove may be disposed on two sides of the oil groove 112, the sliding rail may be fixed on the lower end of the installing plate 115.

In this embodiment, the barbecue grill body 103 is connected to an upper cover 101, the side wall of the upper cover 101 is hinged with a side wall of the barbecue grill body 103, the upper cover 101 may be connected to the barbecue grill body 103 with the common hinge structure in the prior art, such that the upper cover 101 may be open and the barbecue wire mesh 110 is exposed. The upper cover 101 may cover the barbecue grill body 103 and the barbecue grill body 103 is closed, then the food to be barbecued may get more barbecue effects, it is unnecessary to go into details here.

To facilitate placing the barbecue grill body 103, two sides of the barbecue grill body 103 is respectively connected to a supporting frame, two supporting frame are oppositely arranged to support the whole barbecue grill body 103. When the barbecue grill body 103 is placed on the ground or other object, due to the support of the supporting frame, the lower end of barbecue grill body 103 is above the ground or other object.

Specifically, the supporting frame includes four supporting arms 105 which are respectively disposed on two sides of the barbecue grill body 103 and are oppositely arranged. An upper portion of each supporting arm 105 is connected to the outer side wall of the barbecue grill body 103 and the lower end of the supporting arm 105 extends downward and is disposed away from the barbecue grill body 103, such that the whole supporting arm 105 is bent. This structure on one hand, facilitates the collection of the upper end of the barbecue grill body 103 and the supporting arm 105, on the other hand facilitate the support of the lower end of supporting arm 105 to the barbecue grill body 103.

A portion closed to the middle of the upper portion of each supporting arm 105 of the supporting frame is respectively connected to of the barbecue grill body 103 for supporting the barbecue grill body 103 better.

The upper end of the supporting arm 105 is connected to the outer side wall of the barbecue grill body 103, and extends away from the barbecue grill body 103 and forms an extending strip 1051. The barbecue grill further comprises two connecting rods 120, the two connecting rods extend along a direction parallel with a semi-minor axis of the semiellipsoid shaped semiellipsoid shaped cavity and each end of the connecting rods is respectively connected to an upper end of one supporting arm. A placing plate 102 is disposed between and connected with two extending strips 1051 of the supporting arms 105 on the end of the barbecue grill body 103, the placing plate 102 is horizontal in a direction away from the barbecue grill body 103. When the barbecue grill is used, the required object and food may be placed on the placing plate 102, which is convenient for the user to use.

To facilitate carrying the barbecue grill, two sides of the inner end of the placing plate 102 is rotatively connected to the extending strips 1051, such that the outer end of the placing plate 102 may be swung upward, and the volume of the barbecue grill is reduced to facilitate carrying the barbecue grill. When the placing plate 102 is used, the outer end of the placing plate 102 is swung downward and the placing plate 102 is horizontal.

In this embodiment, the barbecue grill 1 includes a moving frame 107, the upper end of the moving frame 107 is connected to the supporting frame and the lower end of the moving frame 107 is provided with a scrolling wheel 1072.

The barbecue grill may be moved by scrolling the scrolling wheel 1072, which is very convenient.

Specifically, the moving frame 107 includes two parallel cross brackets disposed in parallel and an installing frame 1073, each cross bracket includes two bracket arms 1071 of which middle portions are hinged with each other, the installing frame 1073 is respectively connected to the upper end of the respective bracket arm 1071, the supporting frame is connected to the installing frame 1073, the scrolling wheel 1072 is disposed on the lower end of bracket arm 1071.

When the barbecue grill is placed on a suitable place, to facilitate fixing the barbecue grill 1, the number of the scrolling wheel 1072 is two, and the two scrolling wheels 1072 are respectively connected to a lower end of bracket arm 1071 on one side of the two cross brackets. A fixing rod 1074 is connected to the lower ends of bracket arm on the other side of the two cross brackets. Two ends of the fixing rod 1074 is bent downward, such that it may avoid the barbecue grill moving under the action of the scrolling wheel by abutting the fixing rod 1074 with ground or other object. When the user needs to move the barbecue grill 1, the user can lift up the fixing rod 1074 and directly push the moving frame 107, such that under the action of the scrolling wheel 1072, the barbecue grill 1 may be moved, it is very convenient to move the barbecue grill 1 and is labor-saving.

What described above are only preferred embodiments of the present disclosure but are not intended to limit the scope of the present disclosure, any modifications, equivalent replacements and improvements etc. made within the spirit and principle of the present invention, should be included in the protection scope of the present invention.

What is claimed is:

1. A barbecue grill, comprising:
    a semiellipsoid shaped barbecue grill body having a semiellipsoid shaped cavity with an opening in an upper end;
    a heating furnace head disposed in the semiellipsoid shaped cavity;
    a barbecue wire mesh disposed on the opening of the semiellipsoid shaped cavity;
    a hot plate disposed in the semiellipsoid shaped cavity, the hot plate covers a whole top of the heating furnace head and is provided with a plurality of ventilation holes;
    an upper surface of the hot plate is inclined and is provided with a plurality of covering plates on locations corresponding to the plurality of ventilation holes, each covering plate among the plurality of covering plates completely covers a whole top of the plurality of ventilation holes, a first edge of the covering plate is connected to the upper surface of the hot plate and a second edge of the covering plate extends slantwise downwards and a gap is formed between the upper surface of the hot plate and the second edge of the covering plate; and
    four supporting arms connected to two sides of the barbecue grill body respectively, wherein each supporting arm among the four supporting arm include an upper portion, a middle portion and a lower portion, the respective middle portions are connected to an outer side wall of the barbecue grill body, the upper portion of each supporting arm extends downwardly and outwardly from the middle portion, and the lower portion of each supporting arm extends downwardly and outwardly from the middle portion, such that the supporting arm is a greater-than symbol shaped or a less-than symbol shaped.

2. The barbecue grill of claim 1, wherein the hot plate is V-shaped and disposed in the semiellipsoid shaped cavity upside down, and the inclined portions of the V-shaped hot plate are provided with the ventilation hole respectively.

3. The barbecue grill of claim 2, wherein the ventilation holes are strip-shaped and are disposed along a direction parallel to a side of the inclined portion of the V-shaped hot plate, each inclined portion is provided with two rows of ventilation holes.

4. The barbecue grill of claim 1, wherein an inner side wall of the semiellipsoid shaped cavity is provided with flat bosses being symmetrically arranged, the flat bosses are disposed on an outer side of the heating furnace head, and the hot plate is respectively connected to the flat bosses.

5. The barbecue grill of claim 4, wherein the flat bosses are provided with a connecting strip which is provided with an elastic strip extending upward, and the hot plate is provided with an installing hole to be inserted by the elastic strip.

6. The barbecue grill of claim 1, wherein a bottom of the semiellipsoid shaped cavity is provided with an oil falling hole, a lower end of the barbecue grill body is connected to an oil groove provided with a recess aligning with the oil falling hole and provided with a handle.

7. The barbecue grill of claim 1, wherein the heating furnace head is a heating tube, the heating tube is bent in the semiellipsoid shaped cavity and extends beyond the semiellipsoid shaped cavity to form a connecting tube head for connecting with a gas tank, and the connecting tube head is connected to an igniter.

8. The barbecue grill of claim 1, wherein the barbecue grill further comprises two connecting rods, the two connecting rods extend along a direction parallel with a semi-minor axis of the semiellipsoid shaped cavity and each of the connecting rods is respectively connected to an upper end of one supporting arm.

9. The barbecue grill of claim 8, further comprising a placing plate disposed between and connected with the upper portion of the supporting arms, the placing plate is horizontal.

10. The barbecue grill of claim 8, wherein the barbecue grill comprises a moving frame, an upper end of the moving frame is connected to the supporting frame and a lower end of the moving frame is provided with a scrolling wheel.

11. The barbecue grill of claim 10, wherein the moving frame comprises two cross brackets disposed in parallel and an installing frame connected to the supporting frame, each cross bracket comprises two bracket arms, and middle portions of the two bracket arms are hinged with each other, the installing frame is respectively connected to an upper end of the respective bracket arms, the scrolling wheel is disposed on a lower end of the bracket arm on one side of the two cross brackets, and a fixing rod is connected to the lower ends of the bracket arm on the other side of the two cross brackets.

12. A barbecue grill, comprising:
    a semiellipsoid shaped barbecue grill body having a semiellipsoid shaped cavity with an opening in an upper end;
    a heating furnace head disposed in the semiellipsoid shaped cavity;
    a barbecue wire mesh disposed on the opening of the semiellipsoid shaped cavity; and
    a hot plate disposed in the semiellipsoid shaped cavity, the hot plate covers a whole top of the heating furnace head and is provided with a plurality of ventilation holes; and an upper surface of the hot plate is inclined and is provided with a plurality of covering plates on locations corresponding to the plurality of ventilation holes, each covering plate completely covers each of the plurality of the ventilation holes, a first edge of the covering plate is connected to the upper surface of the hot plate and a second edge of the covering plate extends slantwise downwards and a gap is formed between the upper surface of the hot plate and the second edge of the covering plate; and a plurality of supporting arms connected to a respective side of the barbecue grill body, and each supporting arm among the plurality of supporting arms includes an upper portion, a middle portion, and a lower portion, the respective middle portion is connected to an outer side wall of the barbecue grill body, the upper portion extends downwardly and outwardly from the middle portion, and the lower portion extends downwardly and outwardly from the middle portion.

\* \* \* \* \*